April 7, 1964 M. C. ELLISON 3,127,685

SIMULATED LANDING SIGNAL APPARATUS

Filed March 23, 1960 11 Sheets-Sheet 1

INVENTOR.
MICHAEL C. ELLISON
BY
Laurence S. Epstein
ATTORNEYS

April 7, 1964 M. C. ELLISON 3,127,685

SIMULATED LANDING SIGNAL APPARATUS

Filed March 23, 1960 11 Sheets-Sheet 2

INVENTOR.
MICHAEL C. ELLISON

BY

Laurence S. Epstein
ATTORNEYS

INVENTOR.
MICHAEL C. ELLISON
BY
Laurence S. Epstein
ATTORNEYS

April 7, 1964 M. C. ELLISON 3,127,685

SIMULATED LANDING SIGNAL APPARATUS

Filed March 23, 1960 11 Sheets-Sheet 4

INVENTOR.
MICHAEL C. ELLISON
BY
Laurence S. Epstein
ATTORNEYS

INVENTOR.
MICHAEL C. ELLISON
BY
Laurence S. Epstein
ATTORNEYS

INVENTOR.
MICHAEL C. ELLISON
BY
Laurence S. Epstein
ATTORNEYS

April 7, 1964 M. C. ELLISON 3,127,685

SIMULATED LANDING SIGNAL APPARATUS

Filed March 23, 1960 11 Sheets-Sheet 7

INVENTOR.
MICHAEL C. ELLISON
BY
Laurence S. Epstein
ATTORNEYS

INVENTOR.
MICHAEL C. ELLISON
BY
Laurence S. Epstein
ATTORNEYS

INVENTOR.
MICHAEL C. ELLISON
BY
Laurence S. Epstein
ATTORNEYS

INVENTOR.
MICHAEL C. ELLISON
BY
Laurence S. Epstein
ATTORNEYS

INVENTOR.
MICHAEL C. ELLISON
BY
Laurence S. Epstein
ATTORNEYS

United States Patent Office 3,127,685
Patented Apr. 7, 1964

3,127,685
SIMULATED LANDING SIGNAL APPARATUS

Michael C. Ellison, Melbourne, Fla., assignor, by mesne assignments, to the United States of America as represented by the Secretary of the Navy Filed Mar. 23, 1960, Ser. No. 17,236
8 Claims. (Cl. 35—12)

This invention relates in general to training devices and in particular to the generation of a plurality of images on an aircraft carrier model to simulate the arm movements of the signal officer in response to the simulated approach pattern of an aircraft operated by the trainee.

Pilots are called upon very frequently to land on an aircraft carrier or in a very limited space. Such limited landing space requirements imposes severe restrictions upon the skill of the pilot and requires rigorous training. Training under actual conditions is dangerous to the pilot, to other personnel and requires costly equipment. The present invention eliminates the use of operational equipment for training purposes and substitutes an inexpensive and realistic training device.

One of the objects of this invention is to provide an improved scale model simulator for training purposes.

Another object of the invention is to provide a means for simulating the landing of an aircraft on an aircraft carrier.

Another object of the invention is to provide a means to simulate the operation of a signal light system in synchronism with the simulated flight path of an aircraft.

Another object of the invention is to provide a small scale signal lighting system which simulates an aircraft carrier signal light system.

A further object of the invention is to vary the size of the aircraft carrier model in accordance with the speed of the aircraft to simulate changes in distance.

Another object of the invention is to present an indirect view of the aircraft carrier model.

A further object of the invention is to vary the size and direction of the indirect view of the aircraft carrier model in accordance with the simulated flight path of the trainee's aircraft.

Figure 1:
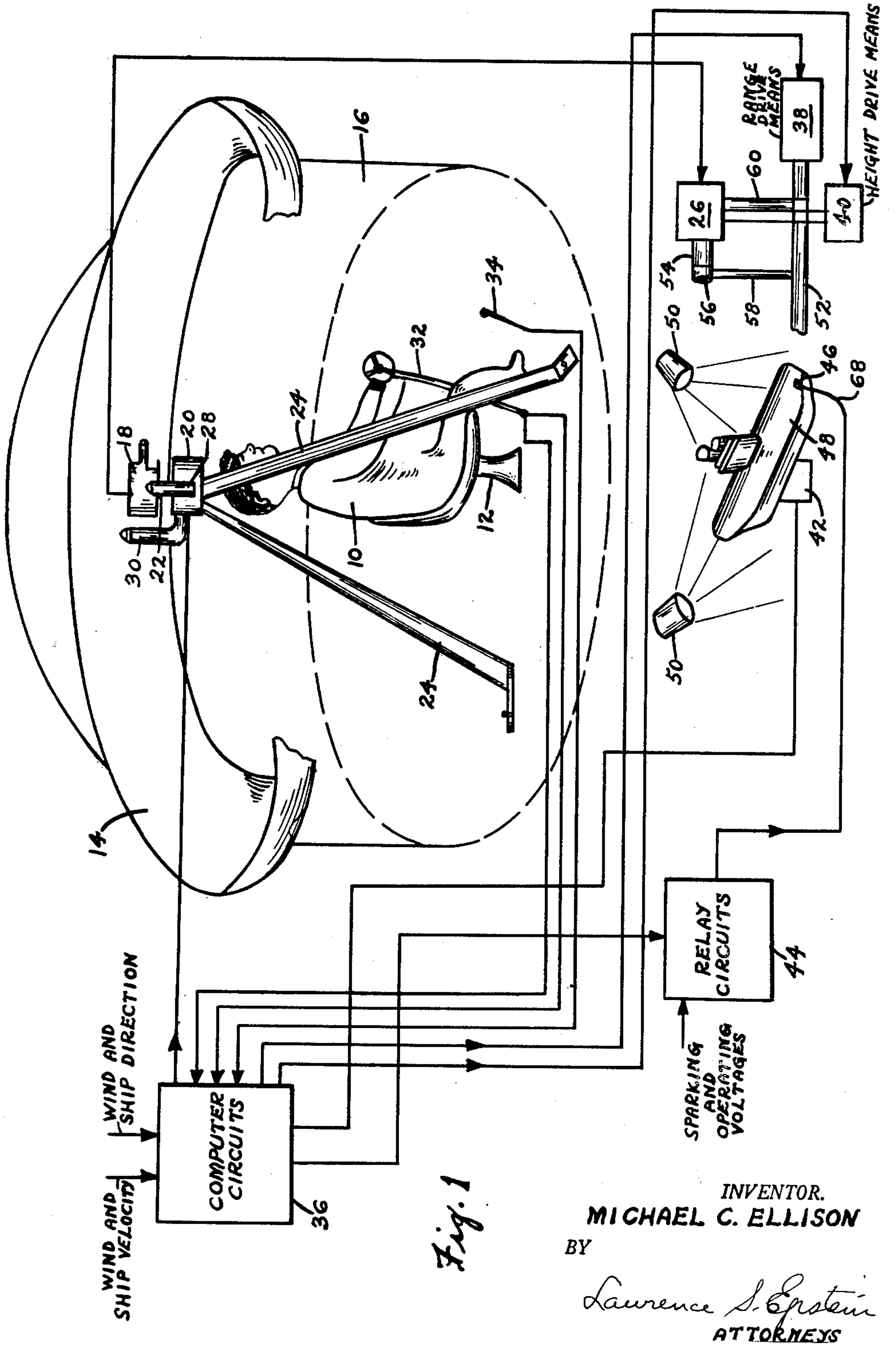
Figures 2, 8:
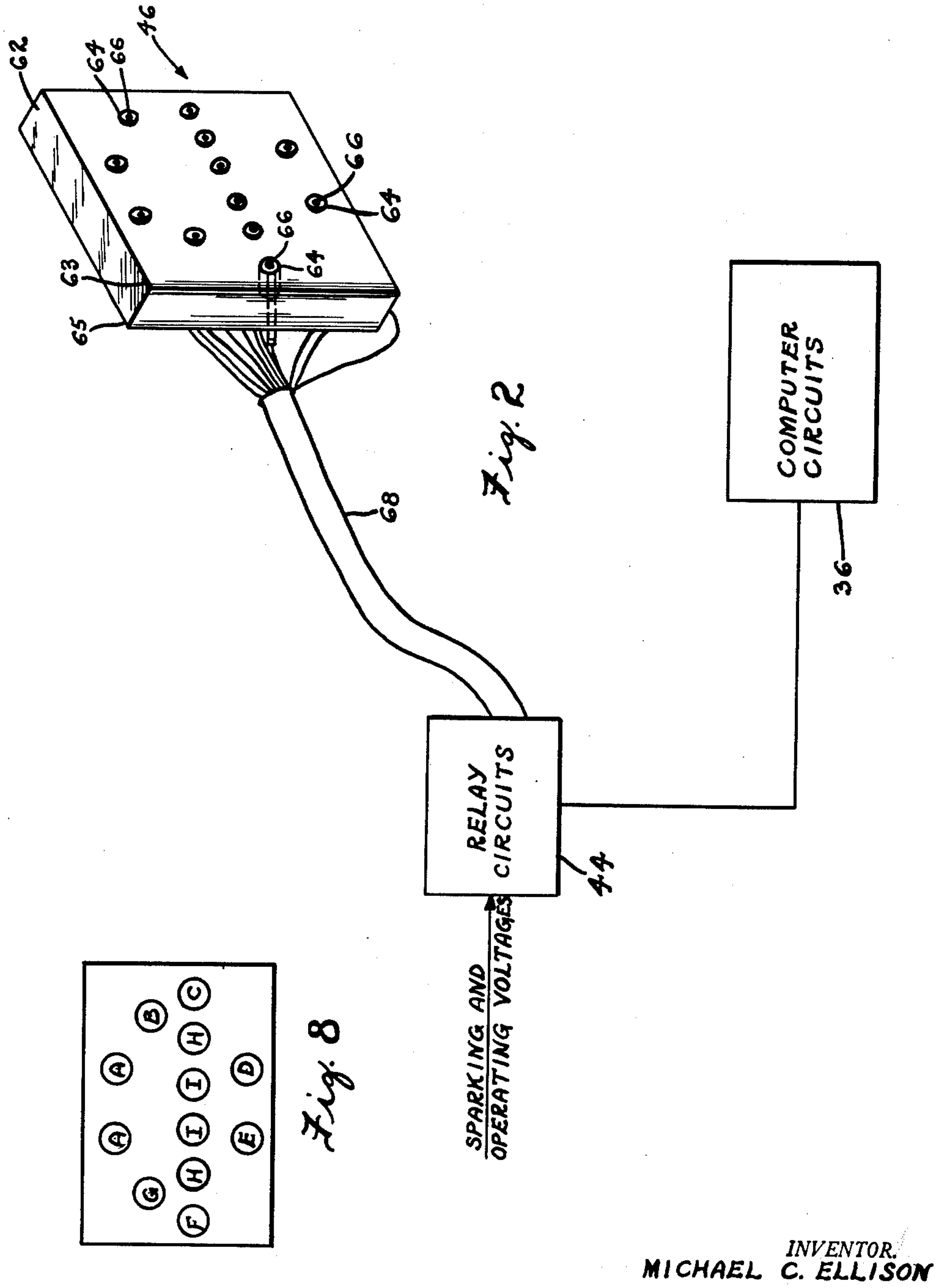
Figure 3A:
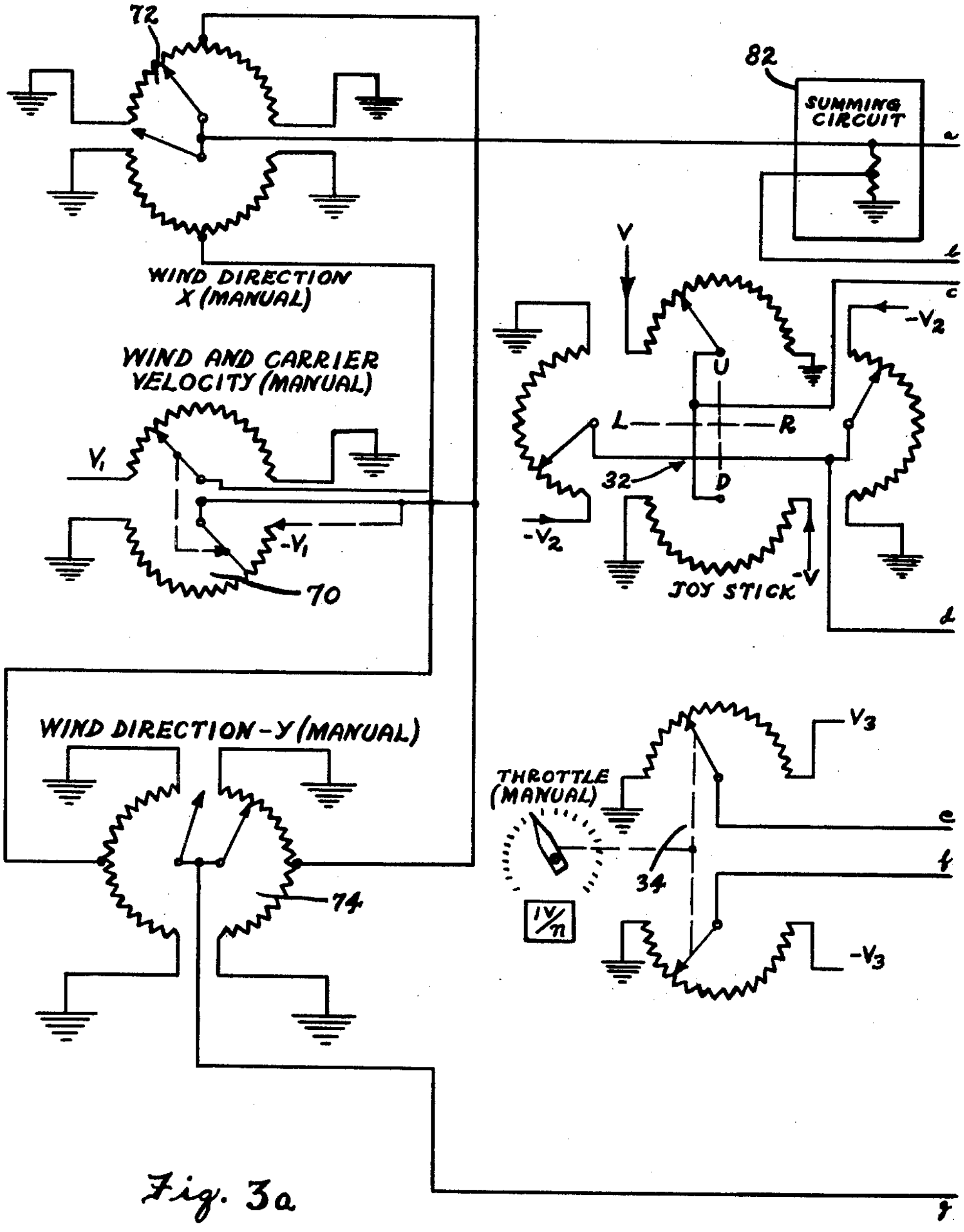
Figure 3B:
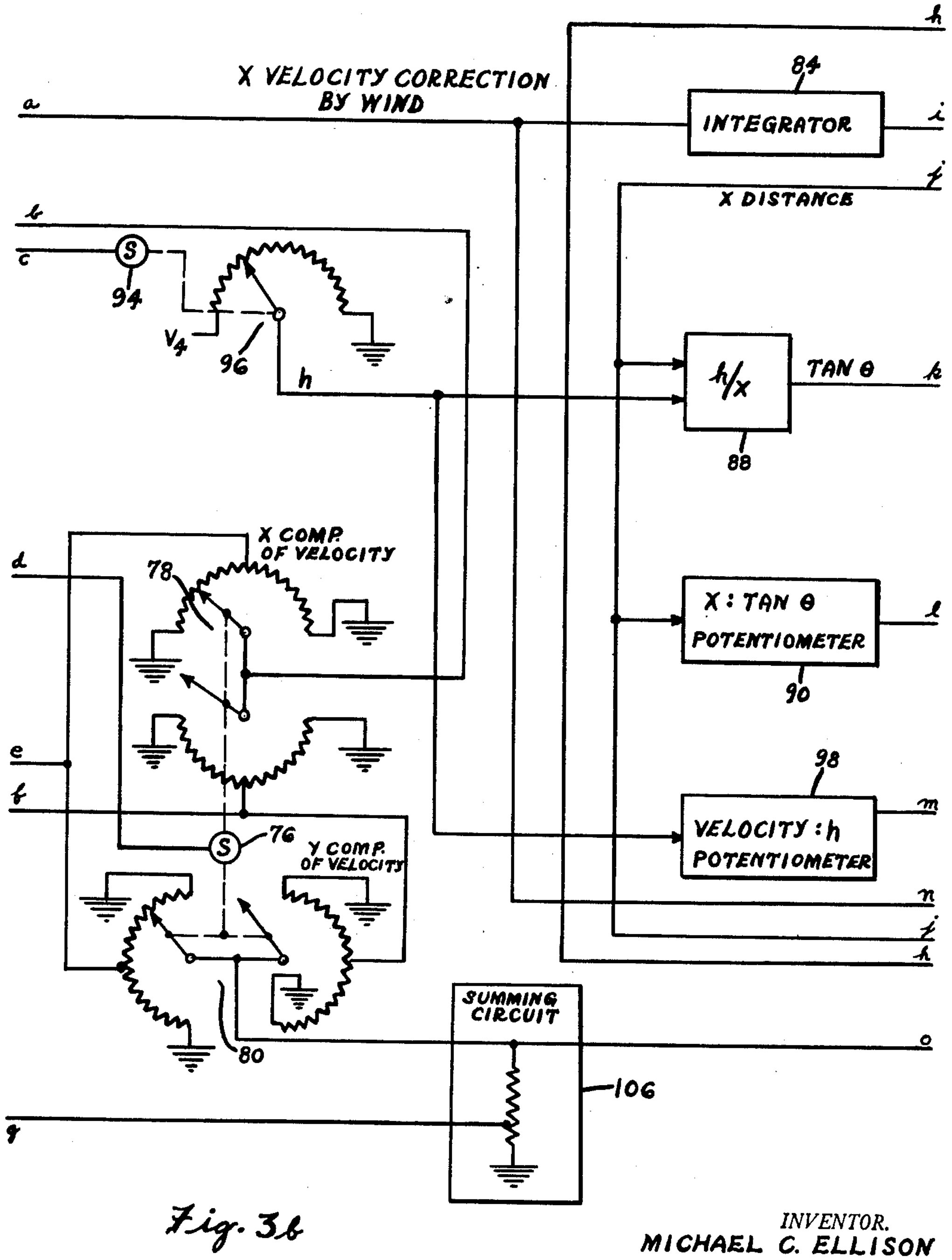
Figure 3C:
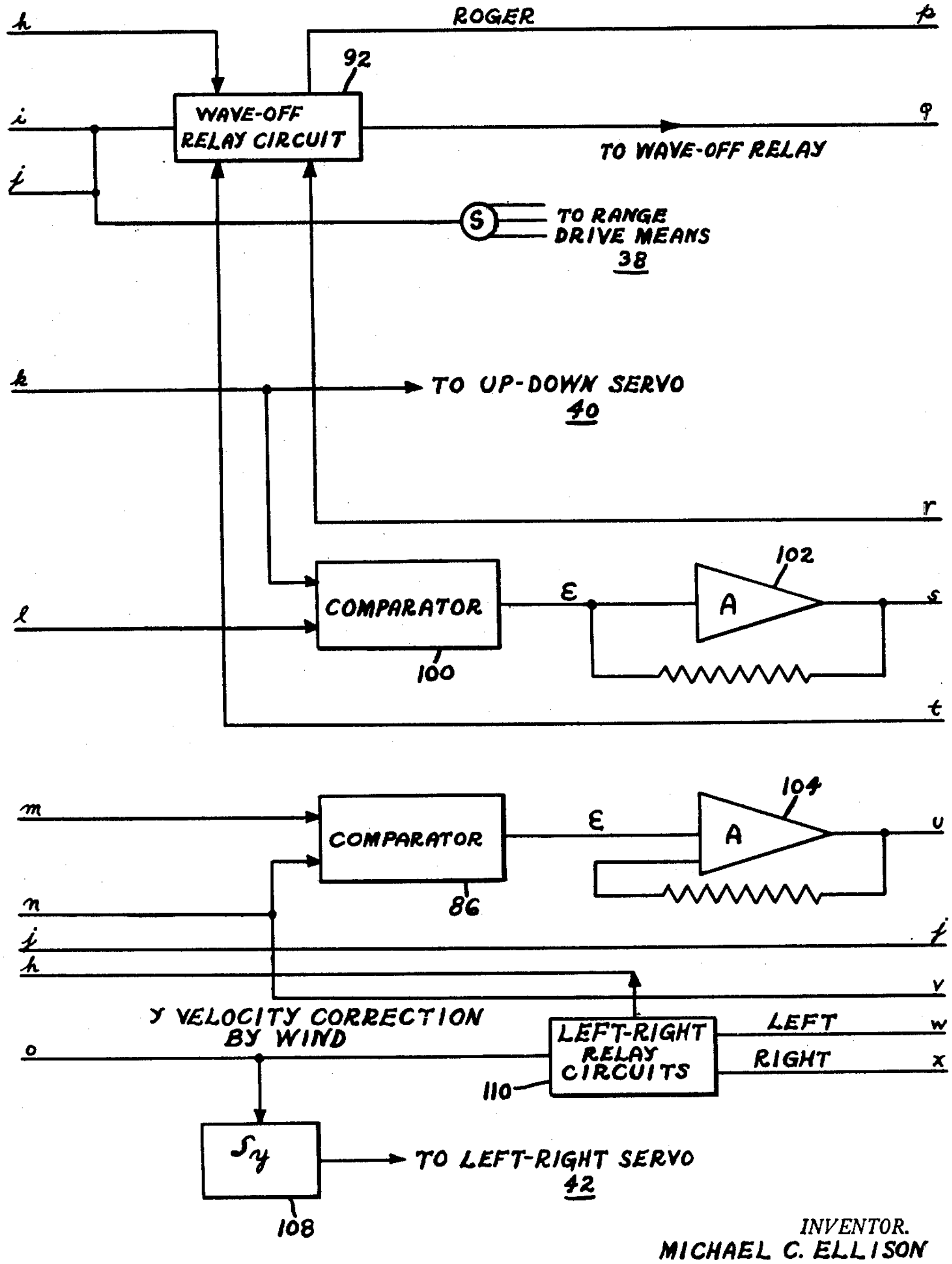
Figure 3D:
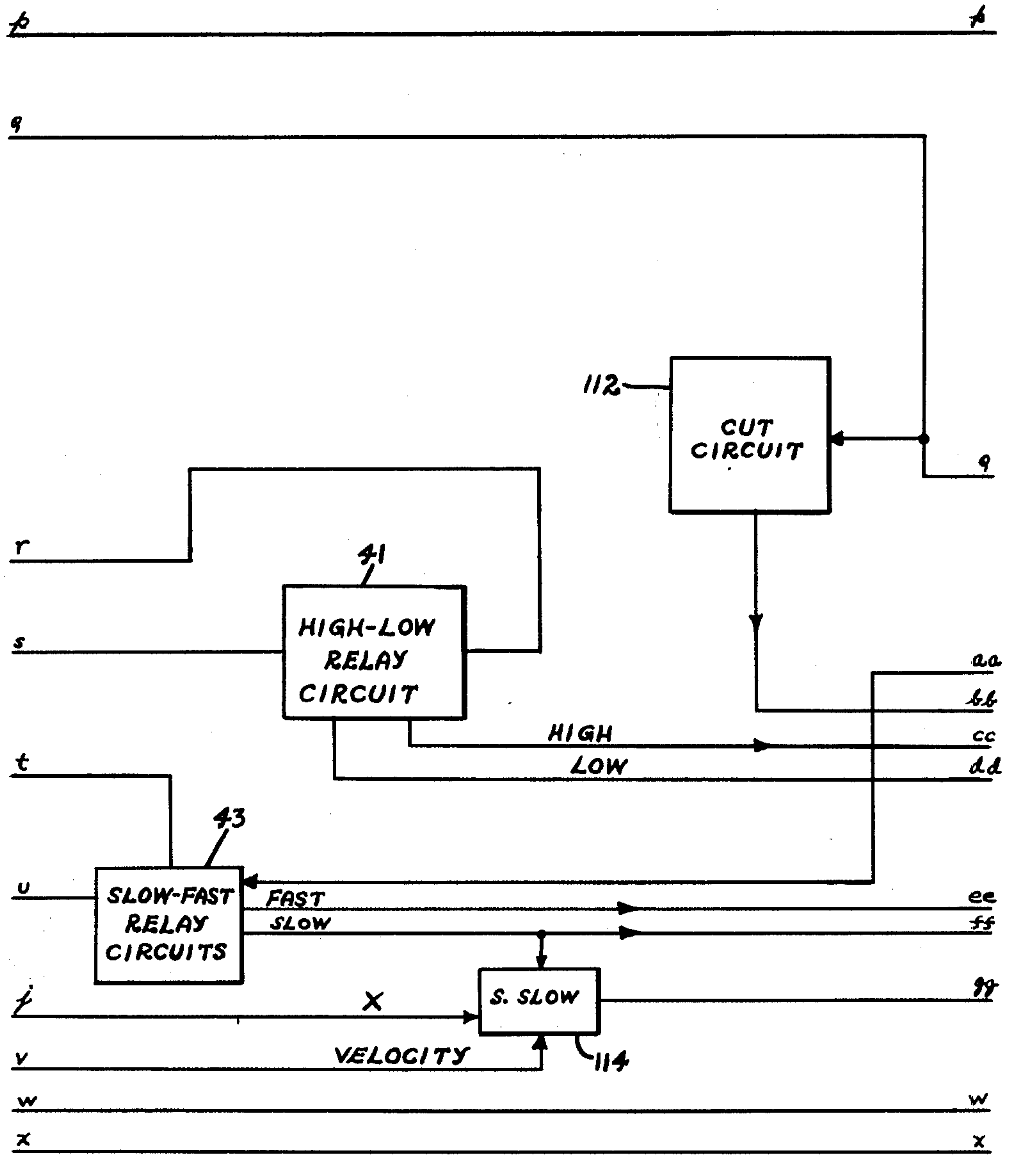
Figure 3E:
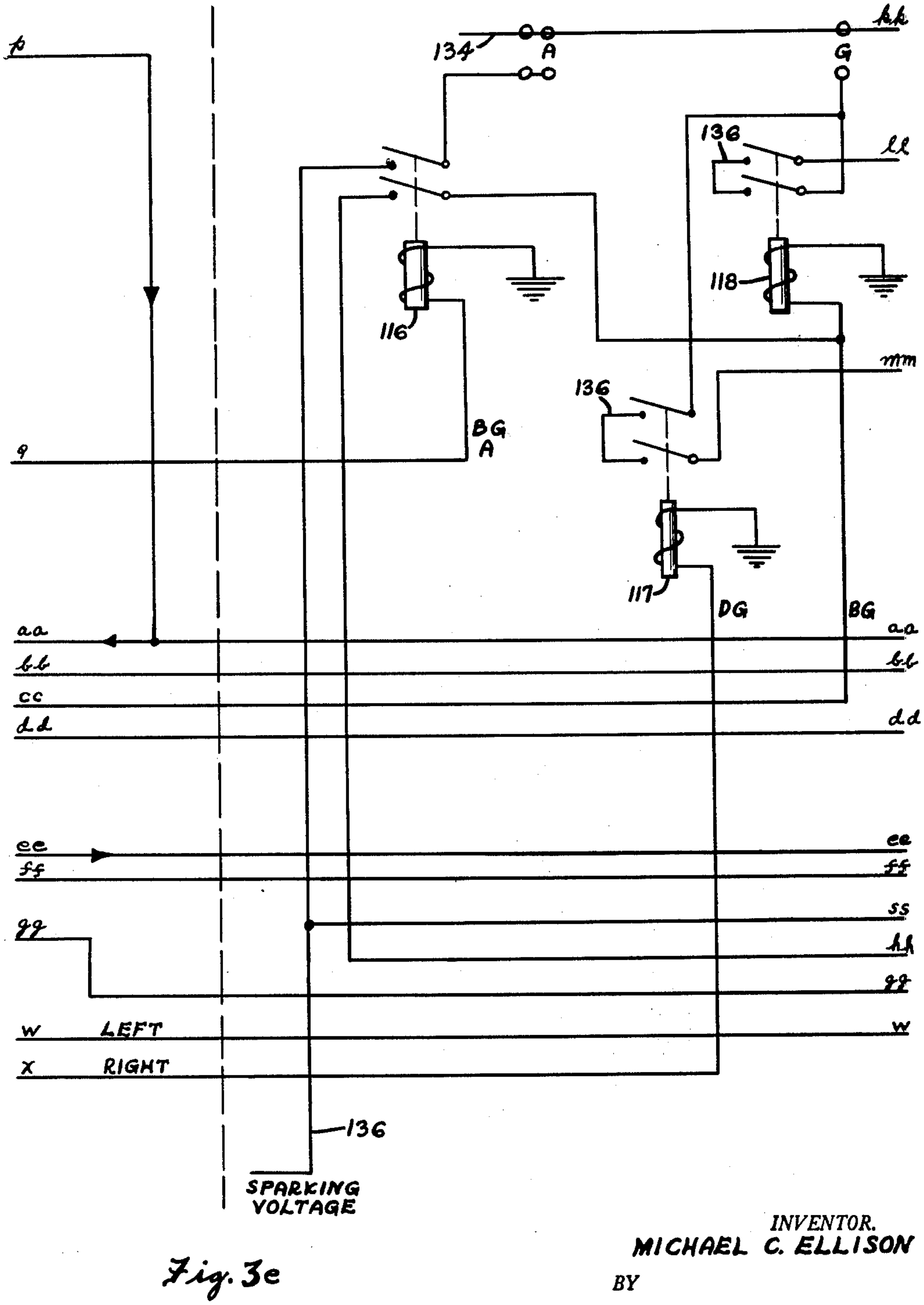
Figure 3F:
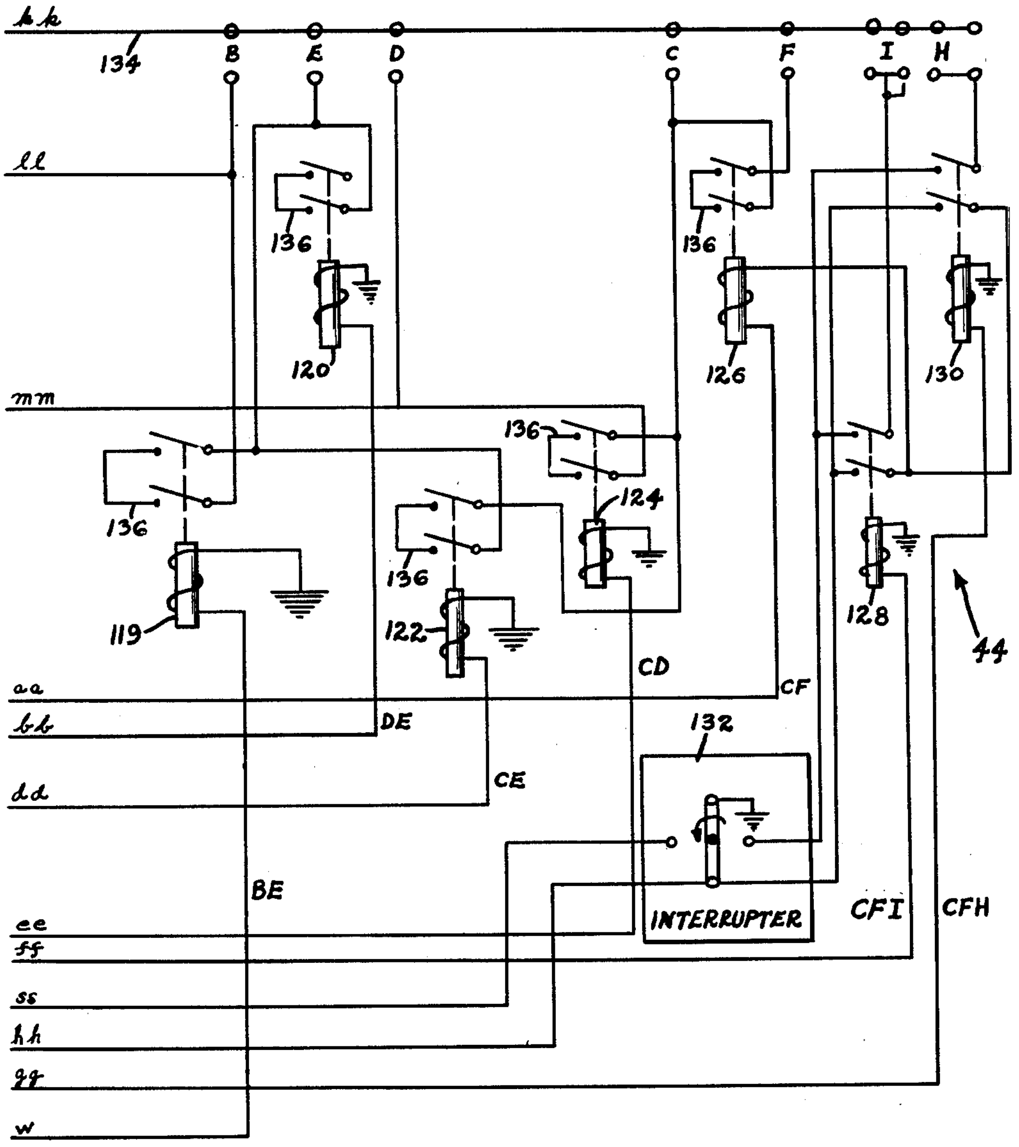
Figure 4:
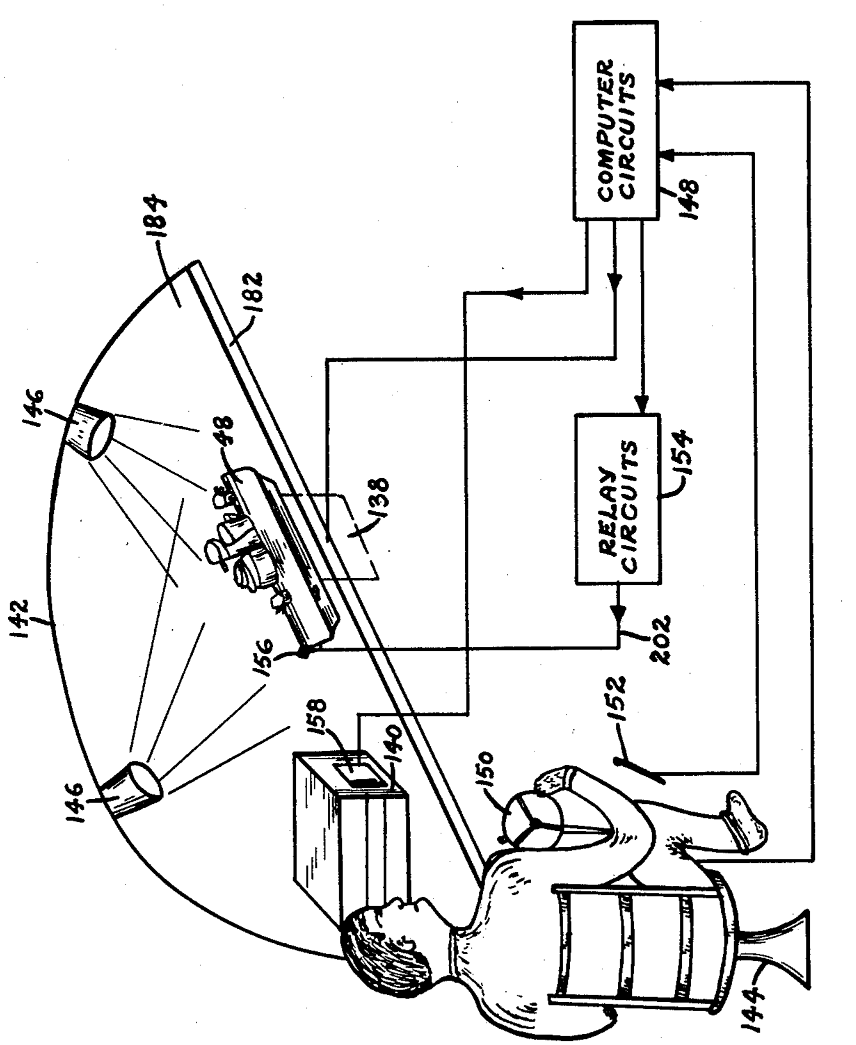
Figures 5, 6:
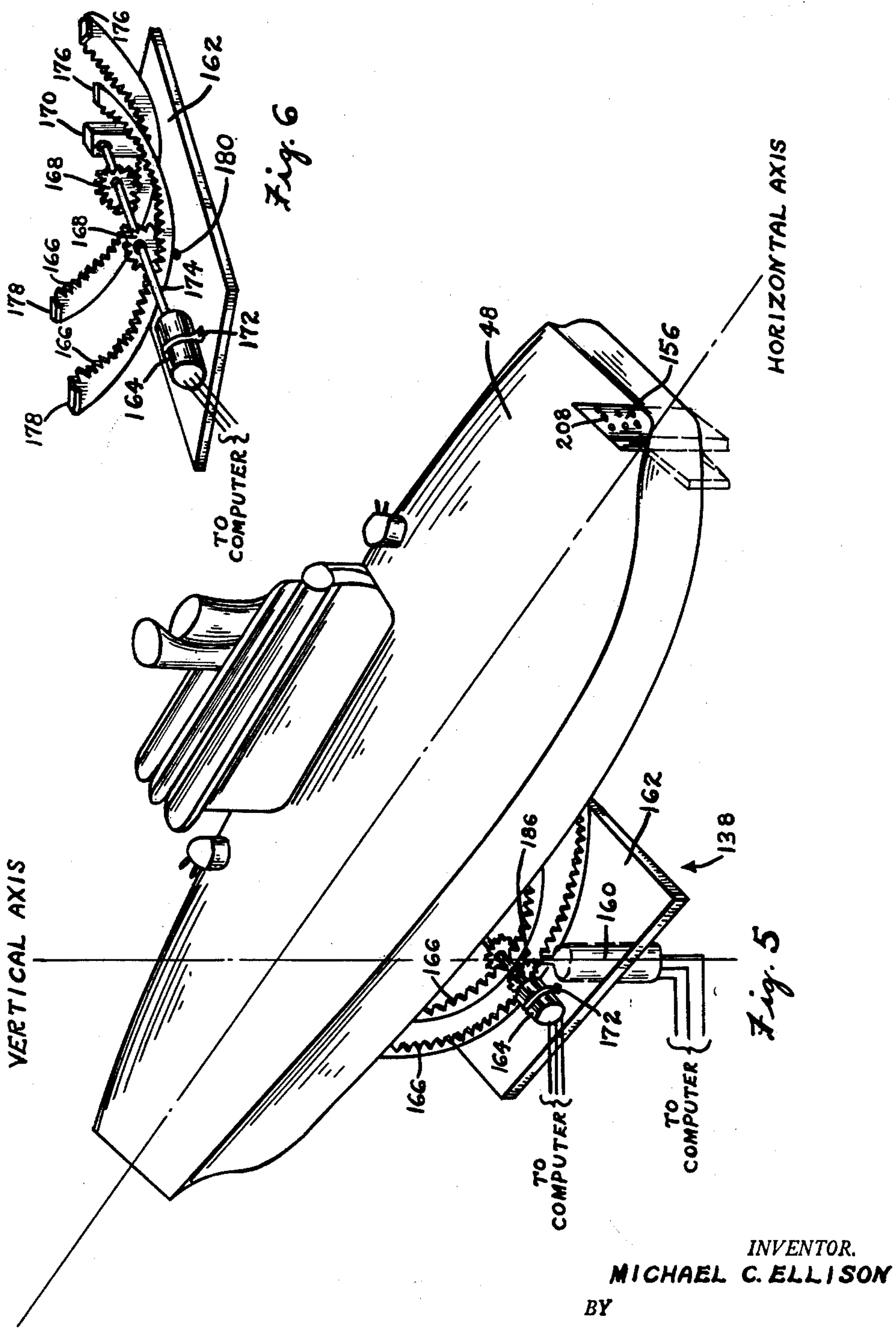
Figure 7:
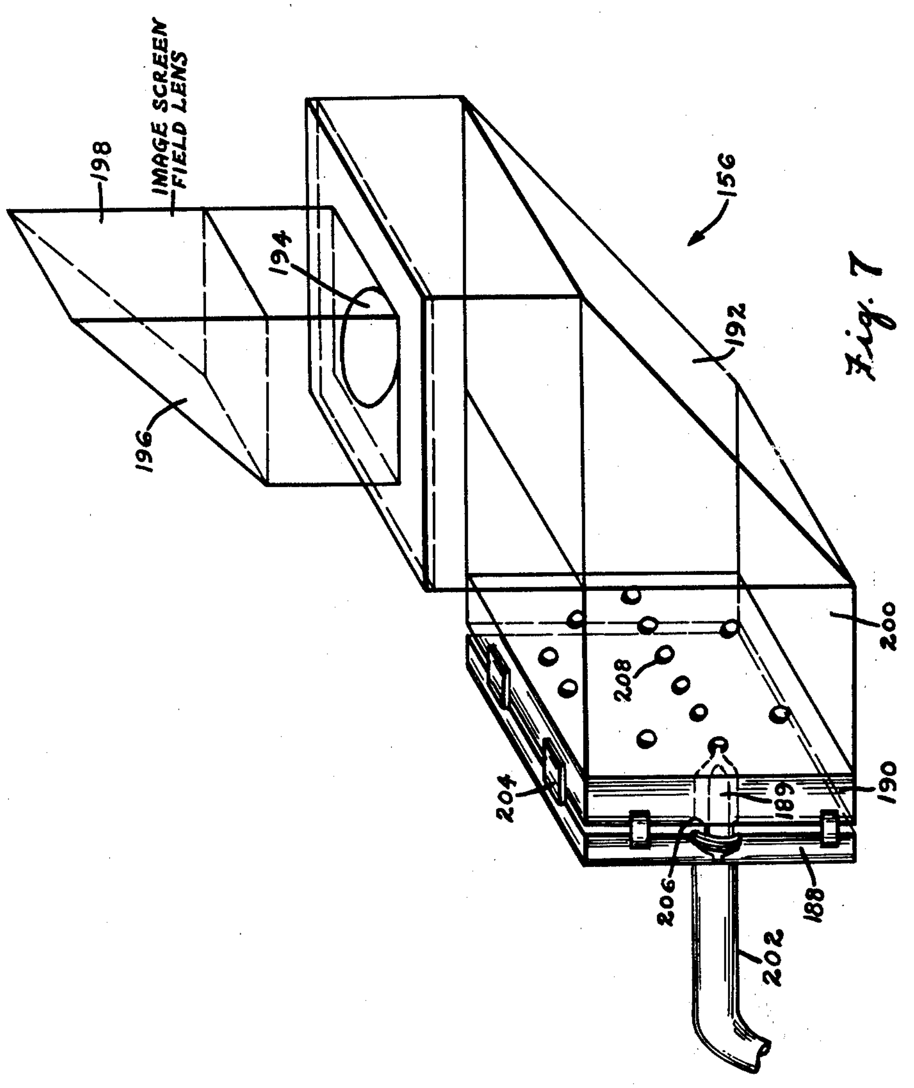

Other objects and many of the attendant advantages of this invention will be readily appreciated as the same becomes better understood by reference to the following detailed description when considered in connection with the accompanying drawings wherein:

FIGURE 1 is a block and perspective view of a preferred form of the simulation system, FIGURE 2 is a detail perspective view of the signal light box of the aircraft carrier model, FIGURES 3*a* to 3*f* are a schematic diagram of the computer circuits of this invention, FIGURE 4 illustrates another form of the invention in which the trainee views the aircraft carrier model directly, FIGURE 5 is an enlarged perspective view of the direct-viewed aircraft carrier model showing the relation of the model to the horizontal and vertical positioning elements, FIGURE 6 is a detailed view of the mechanical parts for vertical positioning of the direct-viewed aircraft carrier model, FIGURE 7 is a diagrammatic view of the reducing lens and mirror system for the direct-viewed signal lighting box, and FIGURE 8 is a schematic representation of the different lights of the signal lighting box of FIGURE 2.

Referring to FIGURE 1, the trainee 10 is seated in a chair 12 in the center of a peripheral viewing screen 14. The screen 14 is substantially at the trainee's eye level and encompasses 360° within a darkened enclosure 16. A television projector camera 18 is mounted on a rotatable housing 22 which is servo controlled at 20 and which is mounted above the head of the trainee 10 in the center of the peripheral viewing screen 14. The servo 20, the housing 22 and the projector 18 are mounted on means 24 which secures the servo 20 in its center position and permits the projector 18 to rotate to any position over 360° in accordance with the positioning signals applied to the servo 20 from the computer circuits 36. Signals picked up by the television pick-up camera 26 are transmitted to the television projector 18 and displayed on the screen 14 at an angular direction as determined by the servo 20. A wing mask 28 and a rear cockpit mask 30, which are secured to the servo 20, mask the image projected by the projector 18 at certain angles to simulate the masking of the pilot's view from the aircraft by the cockpit and the wing. Said masks 28 and 30 are designed for the structure of the aircraft cockpit for which the training is used.

A joy stick control 32 and a throttle control 34 are operated by the trainee. The joy stick 32 is connected to left-right and up-down potentiometers which supply left-right and up-down information as voltages to the computer circuits 36. The throttle 34 controls the magnitude of the velocity information supplied to the computer circuits 36. Wind and carrier model velocity and direction are manually set into the computer circuits 36 or supplied as voltages from some external source.

The computer circuits 36 use the voltages supplied and generate voltages which control the projector servo 20, the camera range drive servo 38, the camera drive servo 40 and the ship rotation servo 42. In addition, the computer circuits supply signaling voltages to actuate the relay circuits 44. The relay circuits 44 supply sparking voltage to the signal lighting box 46 which simulates the arm movements of the landing signal officer on the deck of the aircraft carrier model 48. Sparking and operating voltages are supplied externally to the relay circuits. The aircraft carrier model 48 is illuminated by lights 50 and is rotated by the servo drive 42 which is controlled by signals from the computer circuits 36. Television pick-up camera 26 is focused on model 48 and is moved along rails 52 to or from model 48 by range drive servo 38 to simulate the range movements of the aircraft. The size of model 48 transmitted to projector 18 thereby changes in size in accordance with the range signal supplied to range drive means 38. Automatic focus means 54, which are controlled by a gearing arrangement 58 connected to rails 52, act to maintain the aircraft carrier model 48 image formed on the pick-up camera 26 lens system 56 in focus over the entire range. Height drive means 40 move the pick-up camera up and down on rails 60 in accordance with the height of the simulated aircraft. Thus, the rotation of aircraft carrier model 48, and the range and height movements of pick-up camera 26 serve to simulate the appearance and movements of an aircraft carrier as seen from the cockpit of an aircraft when the aircraft carrier model image is projected onto screen 14.

As shown in FIGURE 2, the landing signal box 46 comprises a rectangular block 62 having a conducting surface 63, a non-conducting surface 65 and a multiplicity of dual diameter holes 64 which have conducting pins coaxially mounted therein. Each conducting pin 66 is electrically and mechanically connected to a separate insulated wire of cable 68. The pins 66 are positioned so as to be non-contacting with their respective coaxial holes in the conducting surface 63. Cable 68 is connected to the relay circuits 44 which supply voltage potentials to the conducting surface 63 and certain of the pins 66 so that sparking occurs between those pins which have voltage applied and the conducting surface.

The letters A through I, have been assigned to the combination of the holes 64 and the pins 66 which comprise spark gaps to indicate sparking as shown in FIGURE 8. Certain spark gaps are in parallel with other spark gaps which have been assigned the same letter. The operation of the lighting signal box and the sequence of sparking will be more fully explained in a subsequent paragraph. As viewed by the pick-up camera 26, the sparking pins simulate the hand positions of the landing signal officer on the deck of the aircraft carrier model.

The computing circuits shown in FIGURE 3 comprise analogue computing circuits adapted to generate voltages which represent the flight path of the aircraft. The magnitude of the wind and aircraft carrier velocity is manually set by the linear potentiometers 70. Plus and minus wind and aircraft carrier velocity voltage from the potentiometers 70 are respectively applied to the X and Y direction potentiometers 72 and 74 respectively. The X and Y components of wind direction are manually set into the potentiometers 72 and 74. The output from potentiometer 72 is the component of wind and aircraft carrier velocity in the X direction. The output from potentiometer 74 is the Y component of wind and aircraft carrier velocity. Joy stick 32 is operatively connected to potentiometers which provide up-down and left-right voltage information as determined by the trainee. Left-right voltage information from joy stick 32 actuates servo 76 which is operatively connected to X and Y components velocity potentiometers 78 and 80 respectively. The trainee controls the throttle control 34 which supplies voltages proportional to speed to the X and Y component velocity potentiometers 78 and 80. Since the X and Y velocity component potentiometers are controlled by directional information from joy stick 32, the voltage output from the X component velocity potentiometer 78 is the X component of velocity and the output from the Y component velocity potentiometer 80 is the Y component of velocity.

The X component of wind and aircraft carrier voltage output from potentiometer 72 is summed with the X component of aircraft velocity in summing circuit 82 the output of which is applied to the integrator 84 and also to the comparator 86. The integrator 84 produces a voltage proportional to the X distance of the aircraft from the carrier which actuates the range drive means 38 and is also applied to the wave-off relay circuit 92, the $h/x$ circuit 88 and the $X$:tan $\theta$ circuit 90.

The up-down voltage information from the joy stick 32 actuates the servo drive means 94 which controls the voltage output from the height potentiometer 96. The voltage output from the height potentiometer 96 is proportional to the simulated height of the aircraft and is applied to the $h/x$ circuits 88 and the vel:$h$ function circuits 98. The $h/x$ circuit 88 uses the height and X distance information supplied, to produce a voltage proportional tan $\theta$ ($\theta$ being the angle between the ground level and the hypotenuse of the right triangle formed by the height and the X distance of the aircraft). The output from the $h/x$ circuit 88 is applied to the comparator circuit 100. The $X$:tan $\theta$ circuit 90 uses the X distance voltage supplied, to generate a voltage which represents the desired tan $\theta$. The desired tan $\theta$ and the tan $\theta$ from the $h/x$ circuit 88 are compared in the comparator 100. The error between the two is amplified by the high gain amplifier 102 and applied to the high-low relay circuits 41 to actuate the high and low signals of the landing signal light box.

The velocity:$h$ circuit 98 uses the height information from the potentiometer 96 to generate a voltage which represents the velocity desired at a specific height. This desired velocity is compared with the simulated velocity in a comparator circuit 86 and the difference between the two is amplified by a high gain amplifier 104 and applied to the slow-fast relay circuits 43 to actuate the fast and slow signal lights of the landing signal light box 46.

The Y component of wind and aircraft carrier voltage output from the potentiometer 74 is summed with the Y component of aircraft velocity from the potentiometer 80 in the summing circuit 106, the output of which is applied to the integrator circuit 108 and also to the left-right relay circuits 110. The integrator 108 produces a voltage proportional to the Y distance of the aircraft from the carrier which actuates the left-right servo 42 to turn the aircraft carrier model. The left-right relay circuits 110 produce voltages to actuate the left and right signal lights of the landing signal light box 46.

Signals from the left-right relay circuits 110, the slow-fast relay circuits 43, the high-low relay circuits 41 and the X component integrator circuit 84 are applied to the wave-off relay circuit 92. The wave-off relay circuit 92 generates a roger signal which indicates a proper approach and actuates the appropriate landing signal lights as shown on FIGURE 4 and FIGURE 8. A wave-off signal is also generated by the wave-off relay 92 which actuates the wave-off signal lights of the landing signal light box 46 and also supplies a signal to the cut circuit 112 which generates a cut signal to actuate the cut signal lights of the landing signal light box 46. This cut signal is given after a proper approach has been made at the proper speed and the pilot is left to his own devices to land. The actuation of the cut signal signifies a successful completion of a simulated landing approach for the trainee.

An S. slow signal is given when it is desired to have the pilot of the aircraft go slightly slower. The S. slow signal is given in place of the slow signal due to the fact that a rapid decrease in air speed may cause the aircraft to stall because the landing approach is taking place at or near stalling speed.

The S. slow circuit 114 utilized the X distance voltage, the X velocity voltage and the slow signal generated by the slow-fast relay circuit 43 to supply an S. slow signal to the landing signal light box 46.

The landing signal light and relay box is shown schematically in FIGURE 3. It comprises the twelve spark gaps 64 and 66 shown in FIGURE 2, the relays 116, 117, 118, 119, 120, 122, 124, 126, 128, and the interrupter 132. Sparking voltage is applied from an external source on two separate leads 134 and 136. The sparking voltage on lead 134 is applied to the conducting surface 63 of the signal light box 46. The sparking voltage on lead 136 is applied to one contact of wave-off relay 116, one contact of the interrupter 132, and both contacts of relays 117, 118, 119, 120, 122, 124 and 126. When relays 116, 117, 118, 119, 120, 122, 124, 126, 128 and 130 are de-energized, the sparking voltage 136 is not applied to the applicable spark gap and sparking does not occur. Energization of one or more relays results in closing of the relay contacts and application of the sparking voltage 136 to the appropriate spark gap to cause sparking. The spark gaps and the relays are actuated in accordance with the signals shown in the following table:

| Signal | Spark Gaps Lighted | Relays Actuated |
|---|---|---|
| Roger | C and F | 126 and 128 or 130.* |
| Wave-off | B, G and A | 116 and 118.* |
| Right | D and G | 117. |
| High | B and G | 118. |
| Left | B and E | 119. |
| Cut | D and E | 120. |
| Low | C and E | 122. |
| Fast | C and D | 124. |
| Slow | C, F and I | 126 and 128.* |
| | C, F and H | 126 and 130. |

The relays marked with an asterisk (*) in the table are actuated intermittently by interrupter 132 to simulate the back and forth movement of the landing signal officer's hands.

FIGURE 4 shows another form of the invention in which the trainee views the aircraft model 48 directly and relative motion between the aircraft carrier model and the trainee is simulated by the combination of the horizontal and vertical drive means 138 and a lens system 140. The trainee sits at the chair 144 and views the carrier ship model 48 through the automatic focus, variable distance lens system 140. The carrier model 48 is in an enclosure 142 and lighted by the lights 146. The movement of the carrier model 48 and the movement of the lens system 140 is controlled by the computer circuits 148 which are supplied with input information from the trainee controlled joy stick 150 and throttle 152. The computer circuits 148 also supply information to the relay circuit 154 to actuate the lights of the signal light box 156 on the deck of the carrier model 48. The computer circuits 148 are conventional and will not be further described. The lens system 140 is a conventional type which is externally controllable to vary the size of a viewed object while maintaining the object in focus. The control means for the lens system 140 is the servo drive means 158. The relay circuits 154 are identical to the relay circuits 44 except for the use of voltages sufficient to light the lamps of the landing signal light box instead of voltages for the spark gaps.

The horizontal and vertical drive means 138 comprise a horizontal servo drive 160 which rotates the plate 162 on which is mounted the vertical drive means 164, the arcuate internally geared sections 166, the gears 168 and the shaft mount 170. The vertical servo drive means 164 is secured to the plate 162 by the mounting means 172 and rotatably secured in the shaft mount 170. The gears 168 are secured to the shaft 174 of the servo drive means 164 and positioned to mesh with the respective geared edges of the arcuate sections 166. The mount 170 and the mounting means 172 are secured to the base plate 162 and maintain the servo drive means 164 and the shaft 174 in a fixed position relative to the base plate 162 permitting rotation of the shaft 174 and the gears 168. The arcuate sections 166 are secured to the carrier model 48 at their ends 176 and 178, and positioned between the gears 168 and the roller means 180. The roller means are rotatably secured in the base plate 162. Means are provided for increasing or decreasing the vertical positioning of the roller means 180 permitting adjustment of the pressure between the arcuate sections 166 and the gears 168. Rotational movement of the shaft 174 which is controlled by the servo drive means 164 moves the carrier model in a vertical direction about its horizontal axis. The shaft 186 of the horizontal servo drive means 160 is secured to the base plate 162 at a point which lies along the vertical axis of the carrier model. The body of the horizontal servo drive means 160 is secured to the enclosure 142 by the mounting means 182. Rotation of the shaft 186 of the horizontal drive means controlled by the horizontal drive means 160, moves the base plate 162, the vertical drive means 164 and the carrier model 48 in a horizontal direction about its vertical axis. The cloth masking means 184 shown on FIGURE 4 covers the gearing and drive means of the carrier model 48 and simulates a large expanse of ocean.

The landing signal light box 156 is mounted at the front of the aircraft carrier model 48. It comprises a rectangular bulb mounting section 188 in which miniature bulbs 189 are mounted in the same arrangements as shown in FIGURE 8, a bulb masking section 190 containing the holes 208, a mirror section 192, a reducing lens system 194, a miror section 196, a field lens 198 and an enclosure.

The bulbs 189 are connected to the cable 202 and are actuated by signals from the relay circuits 154. The bulb mounting section 188 is secured to the masking section 190 by the quick-connect fasteners 204 which permit rapid removal of the bulb mounting section to facilitate bulb removal. A reflector section 206 is located around the base periphery of bulbs 189 to reflect the light output from each bulb towards the masking holes 208. The masking holes 208 are made large enough to obtain the maximum light output from each bulb and reflector section. The bulbs are actuated by the same type of signals as given in the table above for FIGURES 2 and 8. The light output from the masking holes 208 are inverted and reflected by mirror section 192 through the reducing lens system 194 and inverted again and reflected by the mirror section 196 to the field lens 198 on which the light pattern is viewed by the trainee. The reducing lens system 194 reduces the light pattern and spacing of lights as viewed on the field lens 198 to a size consistent with the size of the carrier model.

From the above description it will be evident that the device simulates the landing of an aircraft on an aircraft carrier, providing the landing signals and the relative motion between the carrier and aircraft as seen by the pilot.

While there have been described and illustrated specific embodiments of the invention, it will be obvious that various changes and modifications may be made therein without departing from the field of the invention which should be limited only by the scope of the appended claims.

What I claim is:

1. In an aircraft trainer, an enclosure, a scale model including means for moving said scale model mounted within said enclosure, means mounted within said enclosure for viewing said scale model, computer circuits and relay circuits secured to said enclosure, a landing signal box mounted on said scale model and adapted to be controlled by said relay circuits, said landing box having a plurality of openings in simulation of a landing signal officer's figure, electrode means extending into each of said openings and operatively connected to said relay circuits, and, said computer circuits operatively connected to said relay circuits for control thereof and operatively connected to said viewing means and to said scale model moving means for movement thereof, control means secured to said enclosure and adapted to be operated by the trainee, said control means generating input signals to said computer circuits.

2. In an aircraft trainer for simulation of an aircraft landing on a water borne carrier, a first enclosure, a peripheral screen secured within said first enclosure, a scale model, lights, and television pickup means positioned in a second enclosure, said lights illuminating said scale model, said television pickup means viewing said scale model, means mounted within said first enclosure for projecting an image of said scale model means, said television pickup means operatively connected to said projecting means means moving said television pickup means in range and elevation relative to said scale model, automatic focus means mounted on the television pickup means and maintaining said television pickup viewing means in focus on said scale model for any position of said range moving means, horizontal rotation means operatively connected to the scale model for rotation thereof, computer circuits operatively connected to said horizontal rotation means, a landing signal box mounted on said scale model, relay circuits operatively connected to said landing signal box and adapted to be controlled by said computer circuits, control means mounted within said enclosure and adapted to be operated by the trainee, said control means generating input signals to said computer circuits, said computer circuits operatively connected to and controlling the direction of the projection on the peripheral screen from said projection means, the range and elevation means for the television pickup means, and said relay circuits, said landing box comprising a conducting surface, a plurality of holes in said conducting surface, conducting pins mounted co-axially in said holes and means connecting voltages between the conducting surface and said pins for the creation of visible sparks.

3. The combination of claim 2 wherein said computer circuits comprise means generating the X and Y components of wind and ship velocity, summing means for adding the X component of wind and ship velocity and the X component of aircraft velocity, means generating said X component of aircraft velocity, said summing means operatively connected to said X component of wind and ship velocity means and said X component of aircraft velocity means, said summing means being operatively connected to velocity comparator means and to integrator means which generate a voltage proportional to the integral of the X component of velocity representing the X distance to ship for the aircraft, said X distance signal being operatively connected to relay means, comparator means, function generator means, amplifier means, and drive means, said comparator means, amplifier means, and function generator means being operatively connected to and adapted to supply signals to relay means, summing means for adding said Y component of wind and ship velocity and the Y component of aircraft velocity, means generating said Y component of aircraft velocity, said summing means operatively connected to said Y component of wind and ship velocity means and said Y component of aircraft velocity means, said summing means being operatively connected to integrator means and relay means, said integrator means generating a voltage proportional to the integral of the Y component of velocity representing the distance to ship for the aircraft, said relay means operatively connected to and controlling the operation of relay circuits.

4. The combination of claim 2 wherein the relay circuits comprise relay means operatively interconnected and connected to said signal light box to supply operating voltages for the signal light boxes for simulation of the hand positions of a landing signal officer, and an interrupter operatively interconnected with said relay means to interrupt the operation of said relay means in a planned pattern to simulate the arm movements of a landing signal officer.

5. In an aircraft trainer for simulation of an aircraft landing on a water borne carrier, an enclosure, a scale model, lights and viewing means positioned within said enclosure, said lights illuminating said scale model, means mounted within said enclosure moving said scale model, a landing signal box mounted on said scale model, relay circuits secured to said enclosure and operatively connected to said landing signal box, said landing box having a plurality of openings in simulation of a landing officer's figure, electrode means extending into each of said openings and operatively connected to said relay circuits, and; computer circuits secured to said enclosure and operatively connected to said relay circuits, said scale model moving means and said viewing means, said viewing means comprising a lens system and means for varying the viewed image size, control means secured to said enclosure and adapted to be operated by the trainee, said control means generating input signals to said computer circuits.

6. The combination of claim 5 wherein said scale model moving means comprise horizontal and vertical drive means, mounting means and gearing means, said horizontal and vertical drive means controlled by said computer circuits and operatively connected to said gearing means and said scale model to move the scale model in horizontal and vertical directions.

7. The combination of claim 6 wherein said horizontal and vertical drive means comprise a horizontal drive servo and a vertical drive system, said horizontal drive servo being secured to said enclosure, said vertical drive system comprising a vertical drive servo rotatably secured to said horizontal drive servo and a gearing system secured to said scale model and to the movable shaft of said vertical drive servo, said horizontal and vertical drive servos being operatively connected to and controlled by said computer circuits.

8. The combination of claim 7 wherein said light signal box comprises a plurality of light generating means, operatively connected to said relay circuits, a first image reversing means spaced apart from and at an angle to said light generating means, a second image reversing means spaced apart from and at an angle to said first image reversing means, a reducing lens system secured between said first and second image reversing means for reducing the apparent size and spacing of said light generating means, a field lens spaced apart from and at an angle to said second image reversing means for viewing said reduced light generating means.

References Cited in the file of this patent

UNITED STATES PATENTS

| | | |
|---|---|---|
| 2,591,752 | Wicklund | Apr. 8, 1952 |
| 2,731,737 | Stern | Jan. 24, 1956 |
| 2,883,763 | Schaper | Apr. 28, 1959 |
| 2,924,893 | Cutler | Feb. 16, 1960 |
| 2,979,832 | Klemperer | Apr. 18, 1961 |
| 3,012,337 | Spencer et al. | Dec. 12, 1961 |